United States Patent [19]
Foti

[11] 4,109,543
[45] Aug. 29, 1978

[54] FLEXIBLE COMPOSITE LAMINATE OF WOVEN FABRIC AND THERMOPLASTIC MATERIAL AND METHOD OF MAKING SAID LAMINATE

[75] Inventor: Anthony J. Foti, Cuyahoga Falls, Ohio

[73] Assignee: The Goodyear Tire & Rubber Company, Akron, Ohio

[21] Appl. No.: 684,827

[22] Filed: May 10, 1976

[51] Int. Cl.² ............................................. F16G 1/00
[52] U.S. Cl. .................. 74/231 P; 156/137; 156/306; 428/246; 428/252; 428/483
[58] Field of Search ............... 428/196, 245, 246, 247, 428/260, 441, 248, 250, 251, 252, 255, 264, 483, 507, 265, 249; 198/846, 847; 156/137, 306, 138–141; 74/231 R, 231 P

[56] References Cited
U.S. PATENT DOCUMENTS

| | | | |
|---|---|---|---|
| 2,432,427 | 12/1947 | Kuhn | 428/269 |
| 2,515,778 | 7/1950 | Knowland | 156/182 |
| 2,682,484 | 6/1954 | Thomas | 428/255 |
| 2,704,730 | 3/1955 | Glatt | 428/196 |
| 2,722,495 | 11/1955 | Hedges | 156/231 |
| 2,824,034 | 2/1958 | Worby | 156/231 |
| 2,887,403 | 5/1959 | Wolff | 428/246 |
| 2,955,974 | 10/1960 | Allen et al. | 428/251 |
| 3,023,482 | 3/1962 | Gilloy et al. | 428/269 |
| 3,038,833 | 6/1962 | Glover | 156/322 |
| 3,778,337 | 12/1973 | Mand et al. | 428/229 |
| 3,852,090 | 12/1974 | Leonard et al. | 428/246 |
| 3,944,454 | 3/1976 | Burgheimer | 156/309 |
| 3,973,670 | 8/1976 | Spaar | 139/383 R |

*Primary Examiner*—James J. Bell
*Attorney, Agent, or Firm*—L. A. Germain

[57] ABSTRACT

A composite laminate of relatively light to medium gauge and a method of making the laminate. The laminate comprises a hot melt type thermoplastic material and a textile woven fabric material formed of spun yarns constructed primarily of staple fibers. The thermoplastic material covers and is bonded to at least one face of the fabric and penetrates into the interstices thereof a maximum of from about 15% to about 75% but does not penetrate a substantial amount into the yarn structure itself thereby permitting an optimum amount of flexibility of the laminate. The laminates of the invention are particularly useful as conveyor belts or slings for vehicle tires.

18 Claims, 6 Drawing Figures

U.S. Patent  Aug. 29, 1978  4,109,543
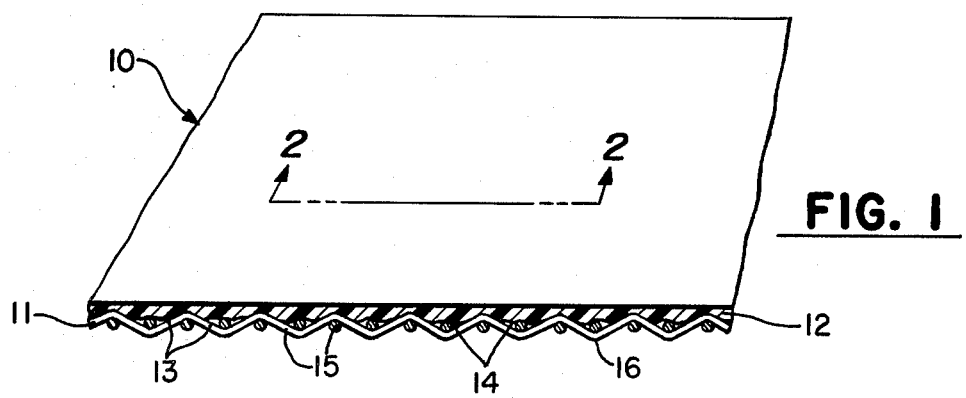
FIG. 1
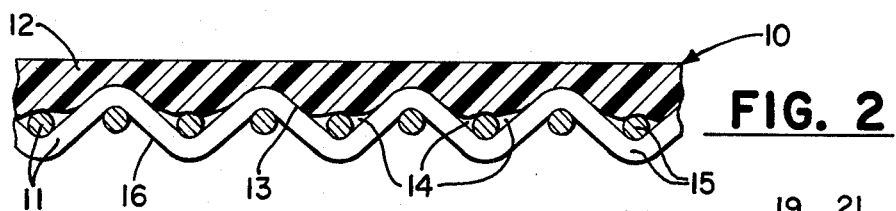
FIG. 2
FIG. 3
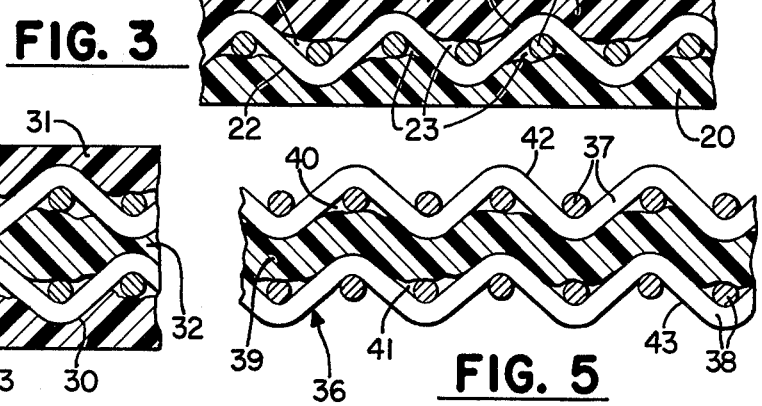
FIG. 4
FIG. 5
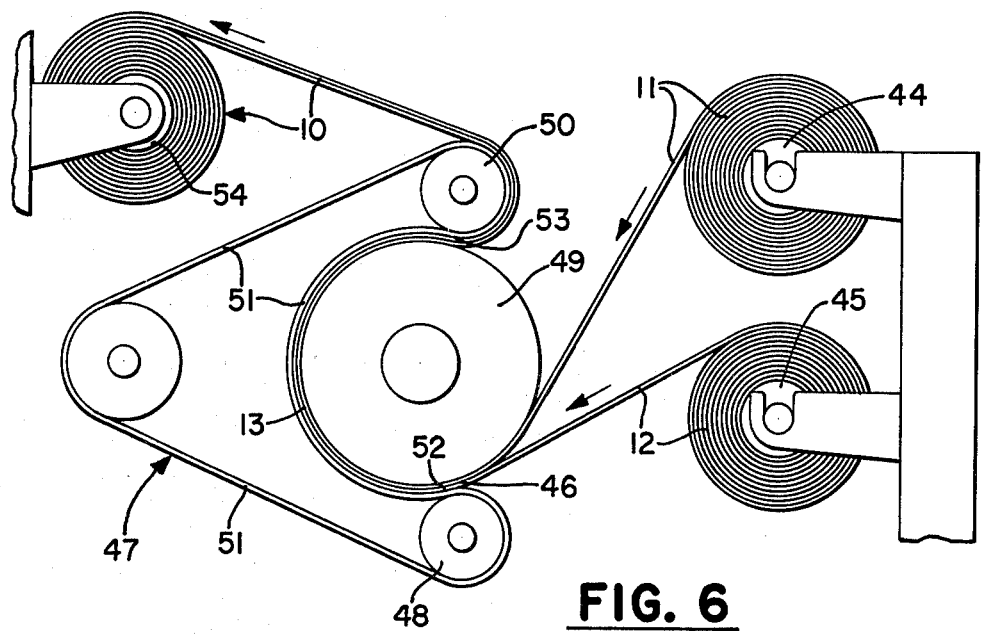
FIG. 6

FLEXIBLE COMPOSITE LAMINATE OF WOVEN FABRIC AND THERMOPLASTIC MATERIAL AND METHOD OF MAKING SAID LAMINATE

BACKGROUND OF THE INVENTION

This invention relates to a composite laminate or bonded laminated structure and to a method of making such laminate. More specifically this invention relates to a highly flexible composite laminate of a relatively light to medium gauge or thickness comprised of a hot melt type thermoplastic material and a textile woven fabric material. This invention even more particularly relates to a laminate of a polyethylene thermoplastic material and a textile fabric material comprised of polyester or a combination of polyester and nylon useful for example, as a conveyor belt or the like.

It is known in the art to form laminates of thermoplastic material and textile woven fabric material for use in products such as conveyor belting and other web-like structures. For example, my co-pending application Ser. No. 525,786 entitled, "Textile Composite Structure and Method of Preparation" filed Nov. 21, 1974, now U.S. Pat. No. 3,962,511 relates to a textile fabric composite such as an industrial belt. The belt is prepared by encapsulating the fibers of the fabric with a polyurethane reaction mixture, drying and at least partially curing the reaction mixture, adhering an overlayer of a flexible thermoplastic to one surface of the encapsulated fabric and pressing the thermoplastic into the interstices of the encapsulated fabric under pressure and with the application of heat. This type laminated structure has been found to be highly satisfactory for use as a heavy duty conveyor belt for example, as used in the handling of abrasive materials such as metal parts, ore or coal. However, this structure is not appropriate for light to medium gauge laminates for example, in the range of from about 0.076 mm to about 0.370 mm (0.030 to 0.145 inches) wherein a high degree of flexibility is desired.

Satisfactory laminates of thermoplastic material and particularly polyethylene type thermoplastic material have been difficult to produce and have been relatively inflexible due to the methods heretofore used for producing such laminates. These methods have generally involved the fabric being totally impregnated with the thermoplastic material by completely filling all the interstices in the fabric as disclosed in U.S. Pat. No. 2,824,034 to Worby entitled, "Methods of Impregnating A Fabric With Polyethylene". Laminated structures in which there is a total penetration of the thermoplastic material into the interstices or voids of the fabric and even in some instances into the yarn structure itself results in a relatively stiff or boardy product having insufficient flexibility. Therefore when such structures are used to produce conveyor belting often flex-cracking occurs after only a limited period of use.

Furthermore, heretofore, if it was desired to have one face or surface of the fabric free of thermoplastic material conventional techniques could not be used since the complete penetration of the fabric interstices by the thermoplastic material resulted in a "strike through" effect with the thermoplastic material being present on each opposite face of the fabric.

It has been found that the disadvantages of the prior art can be overcome by the present invention which will be hereinafter described.

OBJECTS OF THE INVENTION

It is a primary object of the present invention to provide a composite laminate of hot melt type thermoplastic material and a textile woven fabric material having a high degree of flexibility for use as a conveyor belt, sling for vehicle tires or the like structure;

It is another important object of the present invention to provide a highly flexible laminate of the type described which will flex without developing cracks in the surfaces of the laminate;

It is still another object of the present invention to provide a laminate of the type described in which only one face of surface of the fabric material is covered by thermoplastic material;

It is another object of the present invention to provide a laminate of a polyethylene type thermoplastic material and a textile woven fabric material comprised of polyester in which the polyethylene is non-chemically bonded to at least one face of the polyester fabric;

It is still another primary object of the present invention to provide a method of making a composite laminate of the type described in which total penetration of the interstices of the fabric by the thermoplastic material is prevented;

Other objects and advantages of this invention will become apparent hereinafter as the description thereof proceeds, the novel features, arrangements and combinations being clearly pointed out in the specification as well as the claims thereunto appended.

It has been found in accordance with the present invention that the before mentioned objects can be accomplished by providing a composite laminate of a relatively light to medium gauge comprised of a hot melt type thermoplastic material and a textile woven fabric material formed of spun yarns constructed primarily of staple fibers. The thermoplastic material covers and is bonded to at least one face of the fabric and penetrates into the interstices thereof a maximum of from about 15% to about 75% but does not penetrate a substantial amount into the yarn structure thereof thereby permitting an optimum amount of flexibility of the laminate.

It is preferred that the thermoplastic material penetrates into the interstices of the fabric a maximum of from about 20% to about 60% and even more preferably from about 30% to about 50%. Preferably in those instances in which the thermoplastic covers each opposite face of the fabric layer the penetration into the interstices of each face is a maximum of from about 20% to about 30%.

In the preferred form of the invention the thermoplastic material is polyethylene which is non-chemically or mechanically bonded to the fabric which is preferably selected from the group consisting of polyester or combination of polyester and nylon.

The above-mentioned objects and advantages of the invention are also accomplished by a method of making a composite laminate of the type described wherein the method comprises: bonding the thermoplastic material to at least one face of the fabric, permitting the thermoplastic material to penetrate into the interstices of the fabric a maximum of from about 15% to about 75%, and preventing the thermoplastic material from penetrating a substantial amount into the yarn structure to thereby form a laminate having an optimum amount of flexibility.

The method preferably comprises: arranging an assembly of unbonded components in a non-adhered relationship, said components including at least one web of polyethylene thermoplastic material and at least one web of polyester fabric; continuously and progressively heating the assembly at a temperature and time sufficient to cause the thermoplastic material to melt and flow into a portion of the interstices of the fabric and form a non-chemical bond with the fibers of the confronting face thereof; applying only a limited controlled pressure to the assembly during the heating thereof to prevent penetration of the thermoplastic material into the interstices of each face of the fabric beyond the maximum depth of from about 20% to about 30% and to prevent any substantial penetration of the yarns by the thermoplastic material; and cooling the assembly to solidify the thermoplastic material and thereby form a bonded composite laminate of relatively high flexibility.

BRIEF DESCRIPTION OF THE DRAWINGS

FIG. 1 is a perspective view of the composite laminate of the invention;

FIG. 2 is an enlarged section taken on line 2—2 of FIG. 2;

FIGS. 3-5 are modifications of the invention shown in FIG. 2;

FIG. 6 is a diagrammatic view of an apparatus for assembling and manufacturing the composite laminates depicted in FIGS. 1-5.

DESCRIPTION OF THE PREFERRED EMBODIMENTS

Referring now to the drawings, in FIG. 1 a composite laminate or bonded laminated structure is shown in accordance with the present invention. The laminate 10 includes a substrate layer 11 of a textile woven fabric material formed of spun yarns constructed primarily of staple fibers. A layer 12 of a hot melt type thermoplastic material covers and is bonded to one face 13 of the fabric 11 with the thermoplastic material penetrating into a portion of the interstices or voids 14 of the fabric but not penetrating a substantial amount into the yarn structure 15 thereof thereby permitting an optimum amount of flexibility of the laminate.

The composite laminate 10 is of a relatively light to medium gauge for example, in the range of from about 0.076 mm to about 0.370 mm (0.030 to 0.145 inches).

The thermoplastic material penetrates only partially into the interstices 14 of the fabric layer 11 and therefore does not flow through completely and become present on the opposite surface 16 of the fabric layer. Complete or 100% penetration of the fabric 11 resulting in a "strike through" effect is obviously undesirable when a bare carcass finish is desired.

The thermoplastic material penetrates into the interstices of the fabric a maximum of from about 15% to about 75%. It has been determined that any amount of penetration beyond the maximum of 75% causes the laminate to be relatively inflexible and results in a stiff or boardy product. It is preferred that the thermoplastic material penetrate into the interstices of the fabric a maximum of from about 20% to about 60% and it is most preferred that the degree of penetration be from about 30% to about 50%. In this way the laminated structure will have optimum flexibility but a sufficient bond will exist between the thermoplastic material and the fabric material to prevent separation of the layers. Generally the weight of the thermoplastic material is from about 20% to about 60% of the total weight of the composite laminate.

In the practice of the present invention the thermoplastic material comprising the layer 12 includes thermoplastic polymers selected from the group consisting of polyethylene, chlorinated polyethylene, polypropylene and vinyl polymers. Polyethylene type thermoplastics are preferred and particularly those classified as being of a low density. These thermoplastic polymers useful in the practice of the present invention are generally available as solid, thin extruded sheets or films.

Representative polyethylene thermoplastics are high, medium and low density types having a specific gravity generally in the range of from about 0.91 to about 0.96. Preferred are films of low density thermoplastic polyethylene having a specific gravity of from about 0.92 to about 0.95.

The polypropylene thermoplastic polymers typically have a specific gravity in the range of from about 0.89 to about 0.91. Films of polypropylene having a specific gravity of about 0.91 are particularly useful such as Extrel No. 10 produced by Extrudo Film Corporation, a Division of Enjay Chemical Company.

The chlorinated polyethylene films which may be used in the present invention have a specific gravity of from about 1.35 to about 1.39. Such films are produced, for example, by the Films & Flooring Division of The Goodyear Tire & Rubber Company.

Representative of the vinyl type thermoplastics are flexible plasticized films comprised of copolymers of vinyl chloride and vinyl acetate, polymerized vinyl chloride, copolymers of vinylidene and vinyl chloride and copolymers of polyvinyl alcohol and an aldehyde. Preferred is polyvinyl chloride films having a specific gravity of from about 1.15 to about 1.50 and especially preferred are films of this type having a specific gravity of about 1.40.

The thermoplastic layer or coating 12 is generally in the range of from about 0.15 mm to about 0.76 mm (0.006 to 0.030 inches) in thickness.

Various fabrics can be used for the textile woven substrate of this invention produced from various yarns and from various filaments by processes known in the art. Fabrics prepared from polyesters, from polyamids such as nylon, from aramatic polyamids such as aramids, from cellulose and cellulose deratives such as cotton and rayon and from glass are particularly useful. Generally fabrics prepared from polyester, nylon or aramids or combinations thereof are preferred with fabrics prepared from polyesters or a combination of polyester and nylon being most preferred. A desirable fabric for the purpose of this invention is formed of spun yarns constructed primarily of staple fibers having a thickness of about 0.81 mm (0.032 inches) in the greige state and having a weight of about 240 g/mm$^2$ to about 425 g/mm$^2$ (8.5 to 15.0 oz/sq yd). The fabric is preferably of a tight weave or closely woven construction since fabrics of open weave are more readily penetrated by the film or coating material.

In the practice of this invention, suitable polyester yarns are prepared from filaments of high molecular weight linear polyesters which can be drawn into a pliable strong and elastic fiber having a high degree of orientation along the fiber axis. Such polyesters are obtained by reacting a glycol such as ethylene glycol, propylene glycol and the like, with dicarboxylic acids, such as, for example, terephthalic acid, isophthalic acid, stilbene carboxylic acid and the like. Representative of suitable polyesters may be found as set forth in U.S. Pat. Nos. 2,965,613 and 2,465,319. Generally, it is preferred that the polyester is comprised of at least 85% ethylene glycol terephthalate.

In the practice of this invention the nylon yarn is comprised of filaments of nylon. Nylon is recognized as a manufactured fiber in which the fiber-forming substance is a long chain synthetic polyamide in which the amide linkages are attached directly to one or more aliphatic or cycloaliphatic groups. Representative of a nylon is poly(hexamethylene adipamide).

In the further practice of this invention, the aramide is a manufactured fiber in which the fiber-forming substance is generally recognized as a long chain synthetic aromatic polyamide in which at least 85% of the amide linkages are attached directly to two aromatic rings. Representative of an aramid is a poly(p-phenyleneterephthalamide).

If desired the fabric layer 11 may be treated with a suitable adhesion promoter and/or wetting agent known in the art, for example, in a dipping process. Such treatment may be particularly desirable with the use of certain thermoplastic polymers to adhance adhesion with the fabric. Examples of adhesive agents useful in the practice of the present invention include the following: low molecular weight polyethylene macroemulsion, particularly for use with polyethylene thermoplastic films; amorphous polypropylene macroemulsion for use with polypropylene thermoplastics; polyethylenimine polymers particularly for use with chlorinated polyethylene and vinyl type thermoplastics; and polyurethane latex useful as an adhesive for bonding vinyl type thermoplastic films.

Wetting agent liquids such as ordinary water or alkyl phenoxypolyethoxy ethanol may be used to impart stretch or elongation to the fabric web in order to achieve dimensional stability.

After the use of these adhesion promoters and wetting agents the fabric should be allowed to dry, for example, at 100° C (212° F) for 15 minutes.

The dipping and drying operations are accomplished by conventional methods and apparatus well known in the art.

In the preferred embodiment of the invention wherein the thermoplastic material of layer 12 is comprised of a polyethylene thermoplastic polymer and the fabric layer is a spun fabric, for example, of polyester such treatment as described above, though still preferred, has been found not to be absolutely necessary since the melted polyethylene forms a non-chemical bond with the fabric. In this case adhesion is accomplished by means of a mechanical bond created between the polyethylene material and fibers of the textile fabric material. It is believed in this instance that adhesion between the polyethylene coating and the woven fabric is improved because of the small fiberous elements or fibrils present on the surface of the spun fabric.

In the modification of the invention shown in FIG. 3 a composite laminate 17 includes a fabric layer 18 with layers 19 and 20 of thermoplastic material covering each opposite face 21 and 22. In this case it is desirable that the thermoplastic material penetrate into the interstices 23 of each opposite face 21 and 22 a maximum of only from about 20% to about 30% so that the optimum flexibility of the laminate be achieved. The important consideration in this regard is that no more than 75% of the depth or thickness of the interstices 23 of the fabric be filled or penetrated by the thermoplastic material of the layers 19 and 20.

In the embodiment of the invention shown in FIG. 4 the laminate 24 is comprised of two layers of fabric material 25 and 26 having each opposite face 27, 28 and 29, 30 respectively covered by thermoplastic layers 31, 32 and 33. As illustrated, the face 27 is covered by layer 31, face 28 is covered by layer 32 and face 29 by layer 33. Again it is desirable that the thermoplastic material penetrate no more than a maximum of about 20% to about 30% into the interstices 34 and 35 of faces 27, 28 and 29, 30 of each fabric layer 25 and 26 respectively so that optimum flexibility by achieved. It will be noted that the total penetration of any one fabric layer then will not exceed 60% of the total depth or thickness of the layer 25 or 26.

In the form of the invention shown in FIG. 5 the composite laminate 36 includes two layers of fabric 37 and 38 with a layer of thermoplastic material 39 disposed between the two layers 37 and 38. In this instance the thermoplastic material penetrates into the interstices 40, 41 of any one fabric layer 37, 38 in the same general proportion as disclosed with reference to the laminate of FIG. 2. It can be seen that with the embodiment shown in FIG. 5 the outer surfaces 42 and 43 of the laminate will be free of thermoplastic material and will be essentially comprised of bare woven fabric with no "strike through" effect occurring. It is apparent that this same principle can be carried out with the laminate comprised of a plurality of layers of fabric with thermoplastic material disposed between any two layers of the fabric material.

Various uses can be made of the highly flexible laminated structures of the invention and a variety of products can be produced. Among these are industrial belts such as conveyor belts used in grocery store checkout counters, for food handling and for caul belting for the lumber industry. The laminates of the present invention also have been found to be particularly desirable as tire slings for holding vehicle tires and especially radial tires.

In the practice of the present invention the process generally includes bonding the thermoplastic material to at least one face of the fabric, permitting the thermoplastic material to penetrate into the interstices of the fabric to a maximum of from about 15% to about 75%, and preventing the thermoplastic material from penetrating a substantial amount into the yarn structure. A laminate is thereby formed having an optimum amount of flexibility.

In a preferred method of making the composite laminate of the invention the rotational heat molding method is used which employs curing equipment well known in the art. This method is of the type disclosed in U.S. Pat. No. 2,093,904 to Bierer and U.S. Pat. No. 2,515,778 to Knowland the teachings of which are incorporated by reference herein.

The apparatus for assembling and manufacturing the laminate of FIGS. 1 and 2 is shown in FIG. 6 in which a rolled web of fabric 11 either treated or untreated is fed from a let-off roll 44 and joined with a rolled web of thermoplastic film 12 fed from a second let-off roll 45. An assembly of components 46 thereby is formed consisting of plies or layers of thermoplastic material and fabric material arranged in a non-adhered superposed relationship. The components 46 are moved as a unit directly into a combination pressure and heat applying apparatus or Rotocure 47 which includes an inlet pressure roll 48, a heating or curing roll or drum 49 and an outlet pressure roll 50. The unbonded assembly 46 is fed directly between rolls 48 and 49 and is then continuously and progressively heated at a temperature and for a time sufficient to cause the thermoplastic film 12 to melt and flow into a portion of the interstices 14 of the fabric 11 and form a non-chemical bond with the fibers of the confronting face 13 thereof. A composite laminated web 10 is thus produced having a relatively high degree of flexibility appropriate for use as an industrial belt, tire sling or the like.

The apparatus 47 also includes a metal belt or band 51 on which the assembled components 46 are carried through the apparatus 47. The continuous band 51 carries the assembled components 46 through the apparatus 47 after the assembled components pass through the bite at the point of contact 52 between two pressure surfaces defined by the pressure applying roll 48 and the heat applying roll 49 where the components 46 are continuously and progressively heated. The rate of speed of the passage of the components 46 through the apparatus 47 may vary from about 24 to about 34 meters per hour (80 to 110 feet/hr).

Only a limited control pressure is applied to the components 46 during the application of heat to cause the thermoplastic material 12 to be bonded to the fabric 11 and to penetrate into the interstices 14 thereof a maximum of from about 15% to about 75%. By the same token, the thermoplastic material 12 does not penetrate a substantial amount into the yarn structure 15 of the fabric 11.

The application of a limited control pressure is critical in the practice of the invention, since not only is too much pressure undesirable but also too little pressure can result in surface imperfections in the thermoplastic layer and insufficient adhesion between the thermoplastic coating and the fabric. The surface conditions referred to as "pitting" or "marblizing" can result from the application of insufficient pressure. Furthermore, a minimum line pressure must also be maintained for adequate functioning of the continuous band 51 which applies pressure against the heat applying roll or drum 49.

The application of heat is continued for the desired period of time and then the composite is passed to the bite at the point of contact 53 between the heat applying roll 49 and the second or outlet pressure roll 50 and is again subjected to a limited controlled pressure. The thermoplastic material of layer 12 adheres to the heat applying roll 49 with roll 49 subsequently being rapidly cooled so that the thermoplastic material 12 releases therefrom. The finished product 10 is then drawn of the continuous band 51 and wound up on a wind-up roll 54 for storage.

The heat applying roll 49 is typically heated to a temperature of from about 80° C. to about 130° C. (130° F. to 270° F.) under a pressure of from about 2100 kg/cm$^2$ to about 3300 kg/cm$^2$ (30 psi to 47 psi) and is cooled to a temperature of from about 65° C. to about 150° C. (150° F. to 240° F.). The specific temperature and pressure will, of course, largely depend upon the type and dimensions of the thermoplastic and fabric materials being processed. In manufacturing laminates comprised of a low density polyethylene material and a polyester fabric material of typical dimensions of the kind described the heat applying roll is heated to a temperature of from about 120° C. to about 130° C. (250° F. to 270° F.) under a pressure of from about 2700 kg/cm$^2$ to about 2900 kg/cm$^2$ (38 psi to 41 psi) and is cooled to a temperature of from about 105° C. to about 115° C. (220° F. to 240° F.).

Those skilled in the art will realize that many other arrangements of the webs of fabric and thermoplastic material are possible other than as shown in FIG. 6 depending upon the number of plies of fabric and coating layers of thermoplastic desired. In those instances in which the thermoplastic material such as polyethylene is bonded to opposite faces or surfaces of a fabric layer as is shown in FIGS. 2 and 3 the pressure is controlled to prevent penetration into the interstices of each face of the fabric beyond a maximum depth of from about 20% to about 30% as explained previously.

The following examples further illustrate the objects and advantages of the invention.

EXAMPLE I

The web of closely woven polyester textile fabric formed of spun yarns constructed primarily of staple fibers having a weight of 425 g/mm$^2$ (15 oz/sq yd) and a gauge of 0.81 mm (0.032 inches) was treated by dipping in water to attain dimensional stability. Adhesion promoters, if required, should be added to the water to form a suitable solution for that purpose. The fabric was allowed to dry at a temperature of 100° C. (212° F.) for 15 minutes.

The fabric web having a width of 149.9 cm (59 inches) was processed together with a web of low-density polyethylene film having a thickness of 0.20 mm (0.008 inches) and a width of 144.8 cm (57 inches). The specific gravity of the film was 0.92.

As shown in FIG. 6 the webs of polyester fabric and polyethylene were fed separately from their respective let-off rolls with essentially no tension being applied to the polyethylene web. The webs of polyester fabric and polyethylene film were arranged in non-adhered superposed relationship with the fabric web disposed above the polyethylene web and were combined into an assembly of unbonded components adjacent to the bite between the inlet pressure roll and the heat applying roll. These unbonded components were continuously fed through the rotational heat molding machine or Rotocure at a rate of 30.5 m/hr (100 ft/hr). The heat applying roll was set at a temperature of 120° C. (250° F.) and was subjected to a pressure of 2460 kg/cm$^2$ (35 psi) by applying a tension of 6800 kg (1500 lbs) to the continuous band. Subsequently the heat applying roll was cooled to a temperature of 105° C. (220° F.) to permit the polyethylene to solidify and release from the heating surface. The components were united onto a composite laminate by being processed through the remainder of the apparatus as described in relation to FIG. 6.

The composite laminate thus formed had an overall thickness of 0.076 mm (0.032 inches) and was trimmed to a width of 137.2 cm (54 inches). The polyethylene thermoplastic penetrated a maximum of about 40% into the interstices of the fabric with one face of the fabric being bare or free of polyethylene. The polyethylene formed a non-chemical bond with fibrils on the surface of the spun polyester fabric. The gauge of the fabric layer after penetration of the polyethylene was about 0.069 mm (0.027 inches). No adhesion promoter or adhesive agent was used to enhance adhesion between the thermoplastic and the fabric. The laminate was therefore of the type shown in FIGS. 1 and 2.

Tests of the bonded composite indicated that physical properties such as ultimate tensile strength and elongation were satisfactory and a high degree of flexibility was attained without the development of flex cracking.

The composite laminate was then used as a vehicle tire sling for holding radial tires on a radial tire sling belt truck and performed satisfactorily for that purpose.

EXAMPLE II

Two rolls or webs of polyester fabric having the same structure, dimensions and physical properties as described in Example I were treated and dried in the same manner as in Example I.

The two fabric webs were processed together with two webs of low density polyethylene thermoplastic film having a thickness of 20.3 mm (0.008 inches) and one web of this same polyethylene material having a thickness of 40.6 mm (0.016 inches). The specific gravity of the polyethylene film was 0.92.

These webs were again processed on a Rotocure apparatus as shown in FIG. 6 and under similar conditions as described in Example I. The webs of polyethylene film of lighter gauge or thickness were fed into the apparatus above and below the two fabric webs and the web of heavier gauge polyethylene film was disposed between the fabric webs. These unbonded components were continuously fed through the rotational heat molding machine at a rate of 27.4 m/hr (90 ft/hr). The heat applying roll was set at a temperature of 120° C. (250° F.) and was subjected to a pressure of 2780 kg/cm$^2$ (39.5 psi) by applying a tension of 7710 kg (1700 lbs) to the continuous band. Subsequently the heat applying roll was cooled to a temperature of 105° C. (220° F.) to permit the polyethylene to solidify and release from the heating surface. The components were united into a composite laminate by being processed through the remainder of the apparatus as described in relation to FIG. 6.

The composite laminate thus formed had an overall thickness of 2.41 mm (0.095 inches). The polyethylene thermoplastic penetrated a maximum depth of about 20% into the interstices of each face of the fabric layers and formed a non-chemical bond with fibrils on the surface of the spun polyester fabric. No adhesion promoter was used to enhance adhesion. Therefore, a composite laminate of the type shown in FIG. 4 was formed.

The composite laminate was tested similarly to the laminate of Example I and exhibited adequate physical properties with the adhesion between the polyethylene thermoplastic film and the polyester textile fabric layers being excellent.

The composite laminate was then used as a conveyor belt for grocery store check-out counters and has performed very satisfactorily.

While certain representative embodiments and details have been shown for the purpose of illustrating the invention, it will be apparent to those skilled in this art that various changes and modifications may be made therein without departing from the spirit or scope of the invention.

What is claimed is:

1. A composite laminated web of relatively light to medium gauge of from about 0.076mm to about 0.370mm (0.30 inches to 0.145 inches) comprised of a hot melt type thermoplastic material and a closely woven textile fabric material formed of spun yarns constructed primarily of staple polyester fibers wherein the thermoplastic material covers and is bonded to at least one face of said fabric by adhesion of the thermoplastic to minute fibrils of the spun polyester yarn and penetrates into the interstices thereof a maximum of from about 15% to about 75% but does not penetrate a substantial amount to strike through the yarn structure thereof thereby permitting an optimum amount of flexibility of said web.

2. The composite laminated web as claimed in claim 1 wherein said thermoplastic material is comprised of thermoplastic polymers selected from the group consisting of polyethylene, chlorinated polyethylene, polypropylene and vinyl polymers.

3. The composite laminated web as claimed in claim 1 wherein said textile fabric material comprises spun polyester in combination with material selected from the group consisting of cotton, nylon, aramide, rayon, and glass or combinations thereof.

4. The composite laminated web as claimed in claim 2 wherein said thermoplastic polymer is polyethylene.

5. The composite laminated web as claimed in claim 4 wherein said textile fabric material comprises a combination of spun polyester and nylon.

6. The composite laminated web as claimed in claim 1 comprised of a plurality of layers of fabric and wherein said thermoplastic material is disposed between any two layers of said fabric material.

7. The composite laminated web as claimed in claim 1 wherein said thermoplastic material covers each opposite face of said fabric and penetrates into the interstices of each said opposite face a maximum of from about 20% to about 30%.

8. The composite laminate as claimed in claim 7 wherein said thermoplastic material penetrates into the interstices of said fabric a maximum of from about 30% to about 50%.

9. The composite laminated web as claimed in claim 1 wherein the weight of the thermoplastic material is from about 20 to about 60% of the total weight of the composite laminate.

10. The invention as claimed in claim 1 wherein said laminated web is a sling for holding a vehicle tire.

11. The invention as claimed in claim 1 wherein said laminated web is an endless conveyor belt.

12. The laminated web as claimed in claim 4 wherein said polyethylene is a low density type.

13. A method of making a composite laminated web of relatively light to medium gauge comprised of a hot melt type thermoplastic material and a tightly woven fabric material formed of spun yarns constructed primarily of staple polyester fibers, said method comprising the steps of:

(A) arranging an assembly of unbonded components in a non-adhered superposed relation, said components including at least one web of said thermoplastic material and at least one web of said fabric;

(B) continuously and progressively heating said unbonded components at a temperature of from about 80° C. to about 130° C. (180° F. to 270° F.) and for a time sufficient to cause said thermoplastic material to melt and flow into a portion of the interstices of said fabric and form a mechanical bond with minute fibrils of the spun yarn at the confronting face thereof;

(C) applying only a limited controlled pressure of about 2100 kg/cm to about 3300 kg/cm (30 psi to 47 psi) to said components during the heating thereof to prevent penetration of said thermoplastic material into the interstices of each face of said fabric beyond a maximum depth of from about 20% to about 30% and to prevent any strike-through of said yarns by said thermoplastic material; and (D) cooling said components to a temperature of from about 65° C. to about 115° C. (150° F. to 240° F.) to solidify said thermoplastic material and thereby form a bonded composite laminate of relatively high flexibility.

14. The method as claimed in claim 13 wherein said thermoplastic material is comprised of thermoplastic polymers selected from the group consisting of polyethylene, chlorinated polyethylene, polypropylene and vinyl polymers.

15. The method as claimed in claim 13 wherein said textile fabric material comprises spun polyester yarn and material selected from the group consisting of cotton, nylon, aramide, rayon, and glass or combinations thereof.

16. The method as claimed in claim 13 wherein said thermoplastic material is polyethylene and said fabric material comprises spun polyester and nylon.

17. The method as claimed in claim 13 wherein said method comprises passing the unbonded components through the bite between two pressure surfaces and in direct contact therewith; heating at least one said pressure surface causing the thermoplastic material to adhere thereto and rapidly cooling said surface so that said thermoplastic material releases therefrom.

18. The method as claimed in claim 13 wherein said thermoplastic material is a low density polyethylene and said pressure surface is heated to a temperature of from about 120° C. to about 130° C. (250° F. to 270° F.) under a pressure of from about 2700 kg/cm$^2$ to about 2900 kg/cm$^2$ (38.00 psi to 41.00 psi) and is cooled to a temperature of from about 105° C. to about 115° C. (220° F. to 240° F.).

* * * * *